United States Patent [19]

Hildreth

[11] Patent Number: 5,545,853
[45] Date of Patent: Aug. 13, 1996

[54] SURGE-PROTECTED CABLE

[75] Inventor: Nelson Hildreth, Colchester, Vt.

[73] Assignee: Champlain Cable Corporation, Colchester, Vt.

[21] Appl. No.: 93,549

[22] Filed: Jul. 19, 1993

[51] Int. Cl.⁶ .................................................. H01B 7/34
[52] U.S. Cl. .............. 174/120 R; 174/36; 174/120 SC; 174/121 A
[58] Field of Search ........................ 174/36, 120 R, 174/120 SC, 121 A

[56] References Cited

U.S. PATENT DOCUMENTS

| | | | |
|---|---|---|---|
| 4,499,438 | 2/1985 | Cornelius et al. | 174/36 X |
| 4,549,041 | 10/1985 | Shingo et al. | 174/113 R |
| 4,671,896 | 6/1987 | Hasegawa et al. | 174/121 A |
| 5,010,210 | 4/1991 | Sidi et al. | 174/34 |
| 5,103,067 | 4/1992 | Aldissi | 174/36 |
| 5,130,594 | 7/1992 | Taghezout et al. | 310/256 |
| 5,170,010 | 12/1992 | Aldissi | 174/36 |
| 5,171,937 | 12/1992 | Aldissi | 174/36 |
| 5,173,960 | 12/1992 | Dickinson | 174/121 A |
| 5,200,659 | 4/1993 | Clarke | 310/110 |
| 5,200,661 | 4/1993 | Shramo et al. | 310/184 |
| 5,253,317 | 10/1993 | Allen et al. | 174/121 A |
| 5,262,591 | 11/1993 | Aldissi | 174/36 |
| 5,262,592 | 11/1993 | Aldissi | 174/36 |
| 5,315,198 | 5/1994 | Torok | 310/162 |

FOREIGN PATENT DOCUMENTS

| | | | |
|---|---|---|---|
| 190939 | 8/1986 | European Pat. Off. | 174/36 |
| 1280667 | 12/1962 | France | 174/36 |
| 2851388 | 5/1979 | Germany | 174/36 |

*Primary Examiner*—Morris H. Nimmo
*Attorney, Agent, or Firm*—Salzman & Levy

[57] ABSTRACT

The present invention features a surge-protected cable for use in the wire leads and wire-wound stators of electrical motors. The cable of the invention is of the "filter line" type. This invention reduces failures in the stator windings of variable frequency drive (VFD) motors by attenuating peak voltages and transient voltage spikes. The "filter line" type of cable insulation prevents "dirty" power from unabated travel along the axis. This invention's type of filter line cable features a core member of one or more strands of conductive material overlaid with a primary insulation layer containing ferrites and/or magnetites; this layer is then further overlaid with a flame-retardant insulation jacket layer made of high-temperature material. Both the primary insulation and the outer jacket layer are cross-linked.

9 Claims, 7 Drawing Sheets

CH1= Capacitor voltage at point
CH2= Voltage across resistor

1
SURGE-PROTECTED CABLE

FIELD OF THE INVENTION

The present invention pertains to cable that is used in the manufacture of electric motors, and, more particularly, to a surge-protected cable with a ferrite-layer of insulation that attenuates surge currents commonly experienced in modern-day, variable frequency drive (VFD), three-phase, industrial motors.

BACKGROUND OF THE INVENTION

Common three-phase industrial motors are currently being operated with variable frequency drive (VFD) systems to provide more efficient starting capability and energy consumption. In VFD applications, the usually large starting currents are avoided; torque per ampere values are high at any given frequency along the speed-torque curve.

One observed drawback of VFD-driven motors, however, is the large voltage drops across the stator at reduced frequencies. Below an operating frequency of 15 Hz, this effect is considerable. VFD-driven motors sustain increased thermal stresses and higher peak voltages. The inverters of the VFD switching systems usually produce peak voltages that are 1.5 to 2 times as great as the nominal voltage of a nominal voltage supply (compared to 1.4 times as great as the voltage of a sinusoidal power supply). Such large voltage peaks that recur over the cycle of the power waveform create stresses on the insulation of the stator winding.

Insulation degradation also results from extremely fast voltage rise times, which cause an unevenly distributed voltage drop in the motor stator. Eighty percent of the peak voltage appears across the first turn of the first coil of the winding. The ground insulation separating the stator coils from the frame may also be potentially harmed.

Also apparent is a damped "ringing" waveform that appears at the front and rear of each pulse, which thus contributes to transient voltage amplitudes.

Common practice has been to increase the thickness and better the quality of the insulation material used in the stators of VFD-driven motors. While an increased thickness and an improved quality result in higher costs, neither option offers a solution toward protecting the first turn of the coil, which has an insulation that cannot effectively be increased.

A further complication of the aforementioned problem is that, during manufacture, the stator coil is wound randomly. Therefore, during fabrication a statistical variation in the insulation thickness is created. Another unpredictability in manufacture results in pinhole-sized imperfections, producing an uncertainty as to the viability of the insulation.

Lately, it has been suggested that motor failures could be reduced more effectively by eliminating or greatly reducing peak voltages and voltage rise times. Such suggested changes, however, have been directed at modifying the drive system, rather than improving the insulation of the stator wiring.

The present invention reflects the discovery that the motor or coil lead wire insulation can be specially fabricated to eliminate or greatly reduce the peak voltages and transient voltage peaks traveling along the stator wires.

In accordance with the current invention, a new type of "filter line" cable has been perfected that will reduce internal voltage interferences traveling down the wires of the VFD motors. To attenuate harmful voltage peaks, this new type of "filter line" uses insulation containing ferrite.

2

As will be demonstrated hereinafter in the examples presented in the preferred embodiment, voltages at the coil are dampened considerably by the insulation developed by this invention. The band width of the inventive cables is considerably narrower than standard cables used as motor lead wire. Traditionally, motor and coils were left exposed to gentle sign wave power. The introduction of invertors in the motor design, however, has generated pulsating DC with fast rise times. This has caused the motors to experience additional electrical stresses.

This invention is not to be confused, however, with the insulation containing ferrite referred to as "filter line", as illustrated in U.S. Pat. Nos. 5,170,010 (issued to Mahmoud Aldissi on Dec. 8, 1992) and 5,171,937 (also issued to Mahmoud Aldissi on Dec. 15, 1992). These already patented types of "filter line" cable are ones that are primarily shielded from external interferences (such as EMI and RFI) that penetrate the cable layers radially. The present invention distinctly seeks to attenuate voltage transients and peak currents traveling along the wire.

SUMMARY OF THE INVENTION

In accordance with the present invention, there is provided a surge-protected cable for use in the wire leads and wire-wound stators of electrical motors. The cable of the invention is of the "filter line" type. This invention reduces failures in the stator windings of VFD motors by attenuating peak voltages and transient voltage spikes. The "filter line" type of cable insulation prevents "dirty" power from unabated travel along the axis. This invention's type of filter line cable features a core member of one or more strands of conductive material overlaid with a primary insulation layer containing ferrites and/or magnetites; this layer is then further overlaid with a flame-retardant insulation jacket layer comprising high-temperature material. Both the primary insulation and the outer jacket layer are cross-linked.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features a "filter line" type of cable used in the windings of the stators of VFD-driven, three-phase motors. The primary insulation of the cable comprises a cross-linked, ferrite or magnetite-filled, fire-retardant polymer or copolymer material. This ferrite or magnetite-filled material effectively attenuates large voltage spikes, as well as the high rate of rise voltage peaks that travel across the length of the wire.

Figure 1:
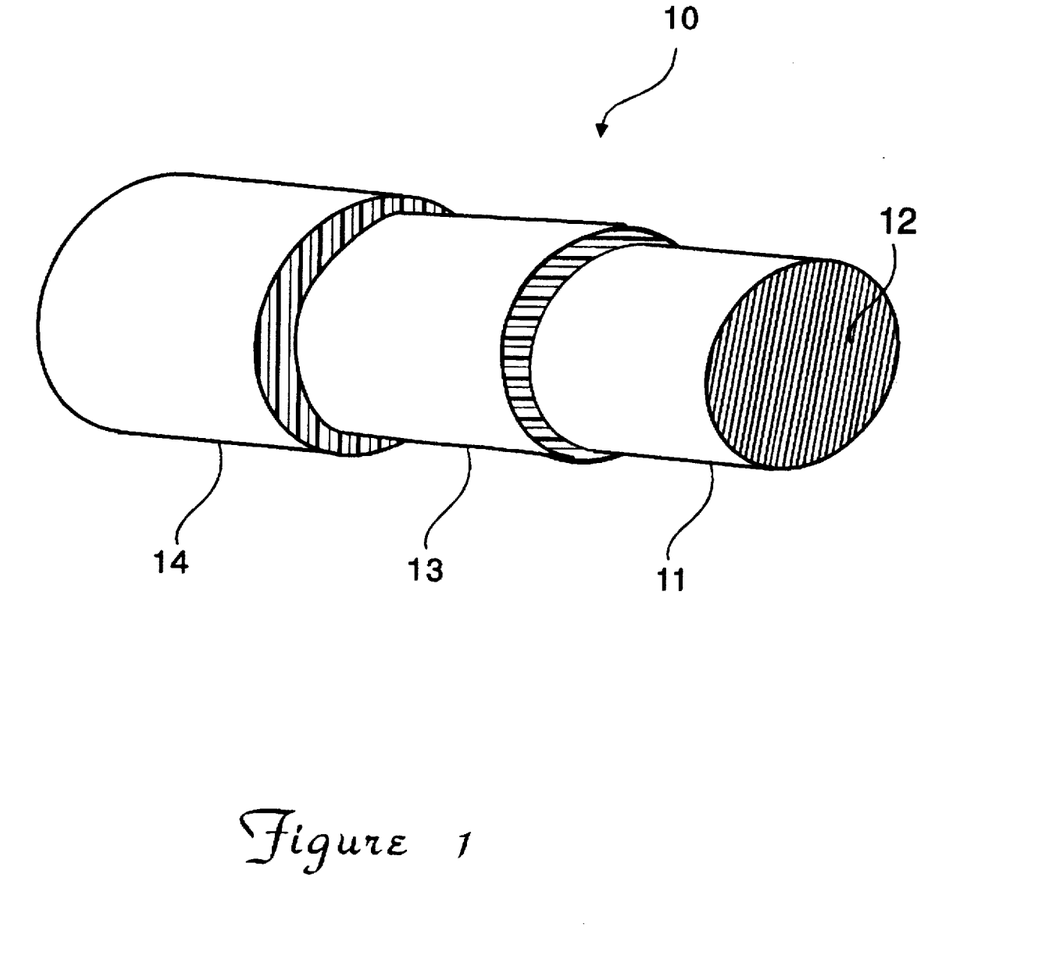
FIG. 1 depicts a perspective view of a filter line type of cable fabricated in accordance with this invention.

Now referring to FIG. 1, a filter line type of cable 10 of this invention is shown in perspective view. The cable 10 is to be primarily used in the manufacture of motors, and, more particularly, for the windings of the stators of VFD-driven, three-phase motors.

The cable 10 is comprised of a conductive core member 11 containing a single metal wire strand 12 of copper or tin-coated copper in gauge sizes from 18 AWG to 410 AWG.

Overlaying the conductive core member 11 is a primary layer 13, such as a cross-linked ethylene propylene-diene monomer eleastomeric material, hereinafter referred to as EPDM or an ethylene-vinyl-acetate copolymer, hereinafter referred to as EVA. The layer 13 is filled with ferrites and/or magnetites in an approximate range of between 20 vol. % and 65 vol. % of EVA. The ferrites and magnetites disposed in the polymer matrix attenuate high-frequency voltage peaks and voltage spikes traveling down the length of the wire. The ferrites and magnetites can be obtained from Steward Manufacturing Company of Tennessee or Fair-Rite Products Corporation of New York.

Over the primary layer 13 is disposed a jacket layer 14 of flame-retardant cross-linked polymer having a temperature rating of at least 125° C. Such a polymer is manufactured by Champlain Cable Corporation of Colchester, Vt., under the trade name EXAR®.

Figure 1A:
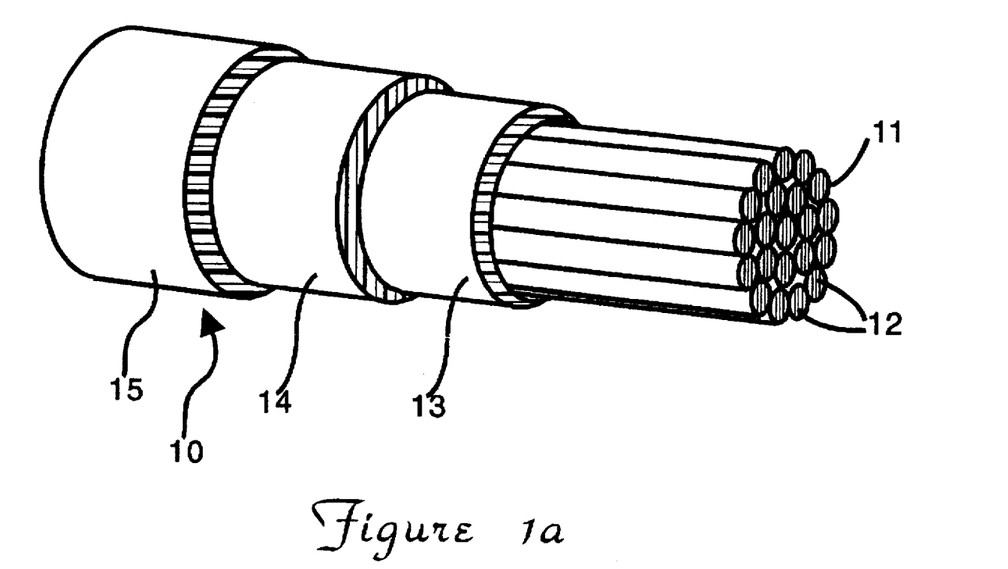
FIG. 1a depicts a perspective view of an alternate embodiment of a filter line type of cable fabricated in accordance with this invention.

Referring to FIG. 1a, an alternate embodiment of cable 10 of FIG. 1 is illustrated. It will be noted that the central conductive core member 11 is comprised of multiple strands 12a.

The filter line type of cable 10 of the invention was designed to dampen high-frequency square wave signals and provide surge protection to commercially available stator wire. It is understood that attenuation or dampening capability can be increased, depending upon the materials and thicknesses of the layers used to manufacture the cable.

Several different samples of the filter line type of cable 10 were fabricated according to the following EXAMPLES:

EXAMPLE NO. 1

Five (5) three-foot samples were prepared using 18 AWG conductor (16 strands of 30 AWG), in accordance with the embodiment shown in FIG. 1a. The samples were constructed as shown below in Table 1.

Sample No. 1 was the control and did not contain any magnetic layer. The insulation was an irradiation cross-linked polyolefin sold under the trade name of EXAR 150.

Sample No. 2 had an inner layer of modified polyvinylidiene fluoride (a non-magnetic layer), a second ferrite layer (consisting of 59.5 volume % dispersed in a fluoroelastomer) and an insulation layer. The insulation layer was an irradiation cross-linked ethylene-tetra fluoroethylene copolymer.

Sample No. 3 had an inner ferrite layer as described in Sample No. 2 and an outer insulation layer as described in Sample No. 1.

Sample No. 4 is the same as Sample No. 3, except for the wall thickness of the ferrite layer. The insulation was a heat-shrunk polyvinylidiene fluoride.

Sample No. 5 had an inner magnetic layer (consisting of 51.7 volume % silver-plated magnetite dispersed in a fluoroelastomer) with an outer insulation layer the same as that in Sample No. 2.

TABLE 1

| Sample No. | Wall Thickness (mils) NonMagnetic Layer | Wall Thickness (mils) Ferrite Layer | Wall Thickness (mils) Magnetite Layer | Wall Thickness (mils) Insulation Layer | 3db Attenuation Frequency |
| --- | --- | --- | --- | --- | --- |
| 1 | | | | 31 | 11.6 MHz |
| 2 | 2 | 7 | | 7 | 8.7 MHz |
| 3 | | 16 | | 31 | 6.7 MHz |
| 4 | | 45 | | 8 | 4.3 MHz |
| 5 | | | 16 | 7 | 10.1 MHz |

EXAMPLE NO. 2

Figure 5:
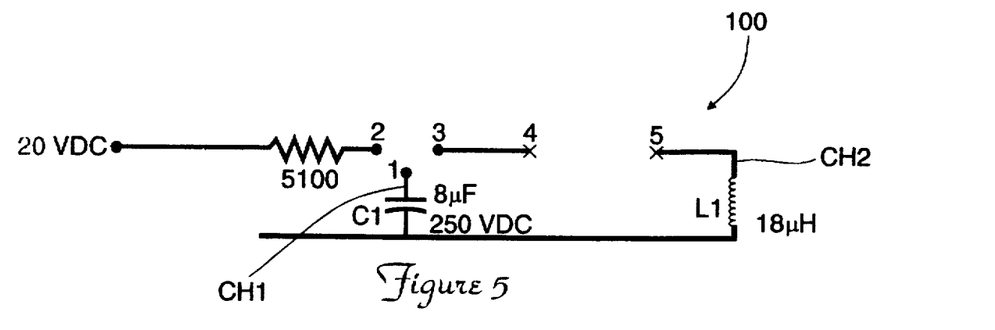
FIG. 5 illustrates a diagram of a circuit that was designed to simulate the rapid rise times that are common with square wave voltages produced in electrical motors, for the purpose of testing the cable and lead wires of this invention.

In order to obtain rapid rise times that are common with square wave type signals (so that the ability of the inventive insulation to attenuate these signals could be demonstrated), the circuit 100 shown in FIG. 5 was designed. Points 1 and 2 of the circuit were connected in order to charge capacitor C1 to 20 volts. Connected points 1 and 2 were then opened. Connected point 1 was connected to point 3 in order to discharge the capacitor C1 through the test wire, which was connected across the points 4 and 5 and the load coil CH2. The coil has 21 turns, 24 AWG insulated around a ½-inch steel dowel 2.33 inches long. Using a Tektronix TDS 420 Digitizing Oscilloscope fitted with Tek P6138 Probes, the response at coil CH2 was recorded. Wires with and without the inventive insulation were tested.

The data obtained from these tests is shown below in Table 2.

Control No. 1 used no lead wire, and point 4 was connected directly to point 5. Rise time was very fast, and voltage across the coil was high.

Sample No. 1 used a 3.5 lead wire as described in EXAMPLE NO. 1, which was connected across points 4 and 5. Standard cable provides some dampening of the signal, as observed by the increase in rise time and lower voltage across the coil.

Sample No. 2 demonstrates that a relatively thin layer of ferrite near the conductor has the effect of narrowing the band width of the cable, where the rise time is more than double that of Sample No. 1.

Sample No. 3, which has a thicker ferrite layer, further reduces the band width and the rise time is increased further.

Sample No. 4 shows even further narrowing of the band width by increasing the ferrite wall thickness.

TABLE 2

Load Response to Capacitor Discharge

| Sample No. | Capacitor Max. Voltage | Max. Coil Voltage | Rise Time |
|---|---|---|---|
| Control #1 | 18.7 | 15.7 | 10 ns |
| 1 | 18.9 | 11.1 | 78 ns |
| 2 | 19.1 | 10.3 | 176 ns |
| 3 | 18.9 | 9.3 | 300 ns |
| 4 | 19.1 | 8.3 | 398 ns |

EXAMPLE NO. 3

Figure 6:
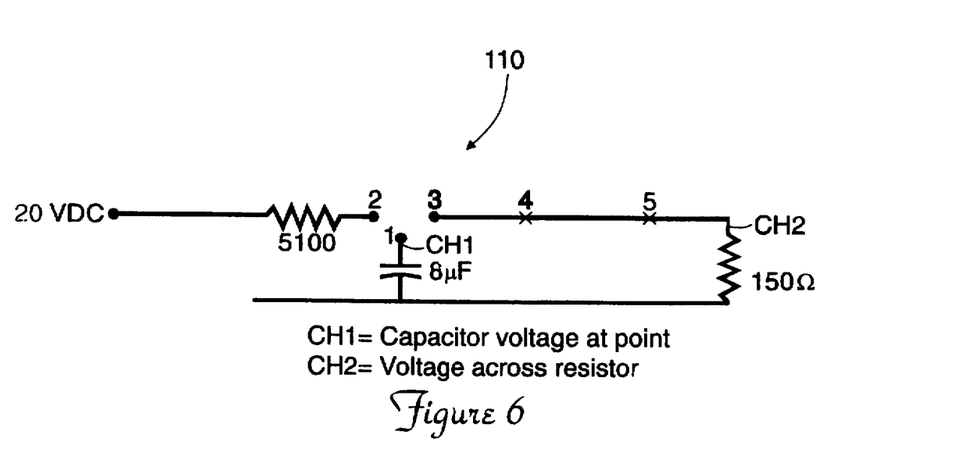
FIG 6 depicts a similar diagram of the circuit shown in FIG. 5, for the purpose of testing the cable and lead wires of this invention.

Referring to FIG. 6, a test circuit 110 was designed, which was similar to the circuit 100 shown in FIG. 5. This test demonstrates that the initial voltage seen across the test coil was not "induced" in the coil, but, rather was impressed on the coil by the capacitor. The coil was replaced with a resistor to demonstrate this fact. The resistance was lowered until the signal across it was similar to the signal seen across a coil. Lead wire (Sample No. 4, shown in Table 1) was then inserted into the circuit 110 ahead of the resistor, and the resultant change to the voltage across the resistor was noted.

The results of this test are shown in Table 3 below:

TABLE 3

Resistor Response to Capacitor Discharge

| Sample No. | DC Resistor | Capacitor Max. Voltage | Max. Resistor Voltage | Rise Time |
|---|---|---|---|---|
| None | 150 ohms | 19.7 | 19.3 | 24 ns |
| None | 5.5 ohms | 19.7 | 14.7 | 80 ns |
| None | 1.8 ohms | 19.7 | 15.1 | 8 ns |
| 4 | 1.8 ohms | 19.5 | 8.9 | 1,710 ns |

Figure 7:
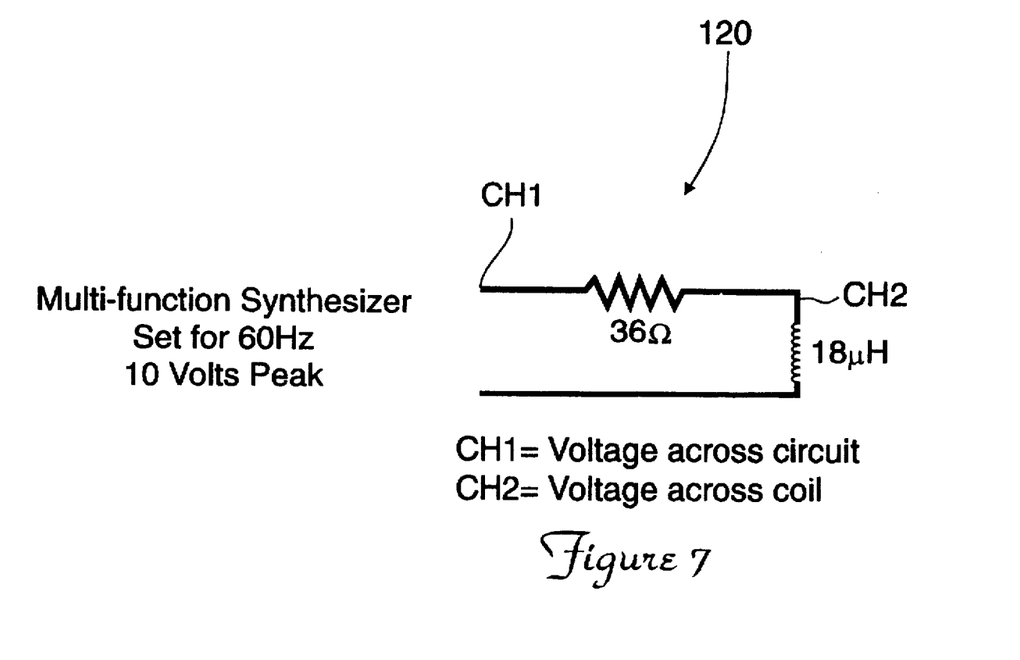
FIG. 7 shows a diagram of a control circuit used in the testing of the cable and lead wires of this invention.

Referring to FIG. 7, a circuit 120 is shown. This circuit was designed to perform a test of the inventive cable to a sinusoid 60 Hz signal set for 10 volts peak. Direct resistance of the coil is 0.093 ohms. The coil behaves as a short circuit. The result of the test is shown below in Table 4.

TABLE 4

| Peak 60 Hz Input Voltage | Max. Coil Voltage | Rise Time |
|---|---|---|
| 4.3 | 0.028 | 0.00196 sec. |

Sample cables were cut into three-foot lengths and were tested for their capability of attenuating voltage signals at various frequencies, ranging from one MHz to 300 MHz. The results are illustrated in the following Table 5.

TABLE 5

ATTENUATION (db/3 ft.)

| Sample No. | Frequency | | | | |
|---|---|---|---|---|---|
| | 10 MHz | 50 MHz | 100 MHz | 200 MHz | 300 MHz |
| 1 (224-38-8) | 0.5 | 3.5 | 8.9 | | 44.6 |
| 2 (224-38-9) | 0.7 | | 8.9 | 22.3 | 38.2 |
| 3 (224-39-2) | 0.8 | 2.5 | 5.2 | | 21.2 |
| 4 | 0.7 | 2.6 | 5.2 | | 22.8 |
| 5 (224-38-1) | 0.2 | | 3.6 | 10.5 | 19.3 |
| 6 (224-38-2) | 0.5 | | 5.6 | 16.5 | 30.6 |
| 7 (224-38-3) | 1.0 | | 8.1 | 23.5 | 43.9 |
| 8 | 1.0 | | 10.5 | 29.6 | 53.9 |
| 9 (224-38-6) | 0.2 | | 8.3 | 23.2 | 42.1 |
| 10 (224-38-7) | 0.1 | | 8.8 | 23.5 | 42.4 |

Figure 4:
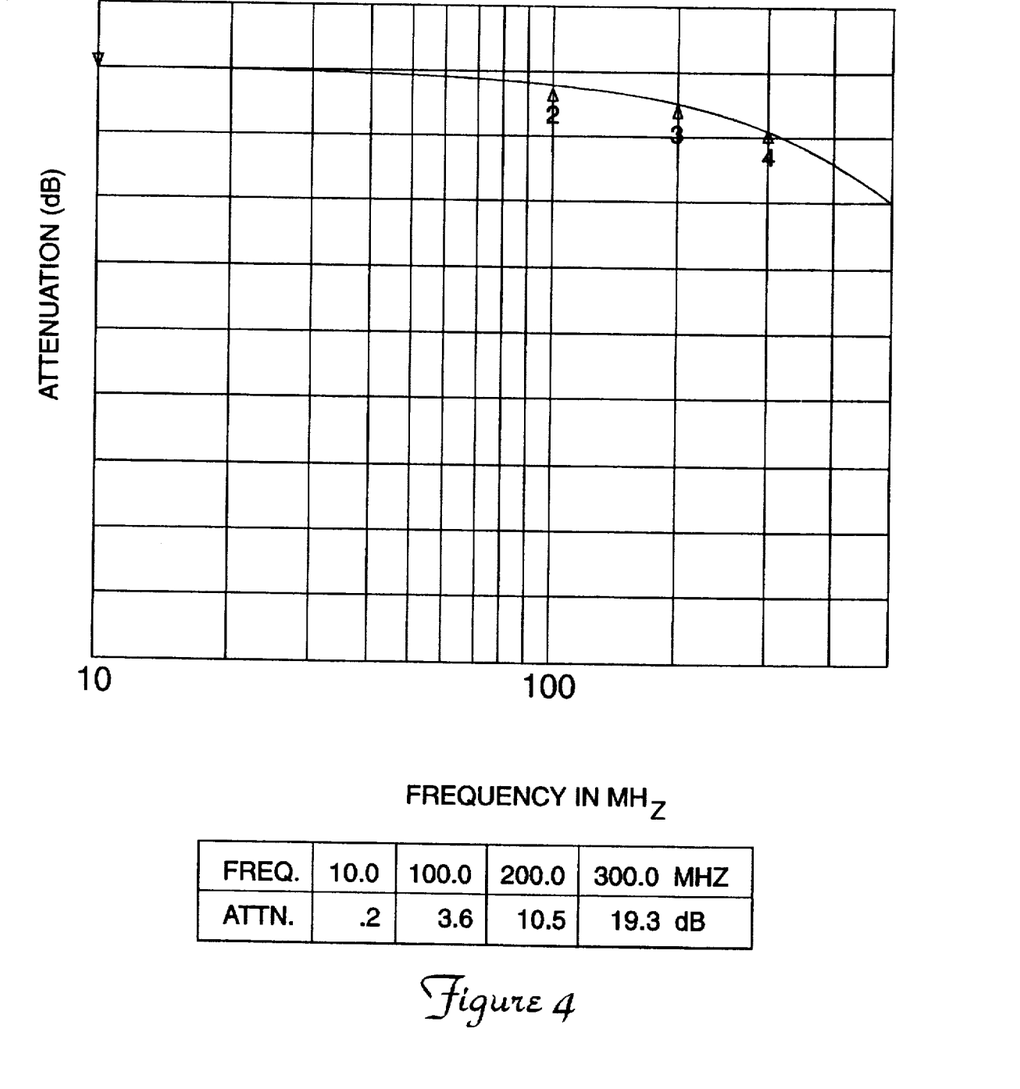
FIG. 4 depicts a graph for a typical cable without ferrites, which illustrates limited voltage attenuation capability at higher frequencies.

The above Table shows that the ferrite-filled EXAR® Sample Nos. 6 through 10 provide increased attenuation of voltage at the higher frequencies in which voltage spikes and high rates of voltage rise are experienced in VFD-driven motors. The attenuation of Sample No. 5 (featuring a primary insulation layer of EXAR® without ferrites) is graphically shown in FIG. 4.

Figure 2:
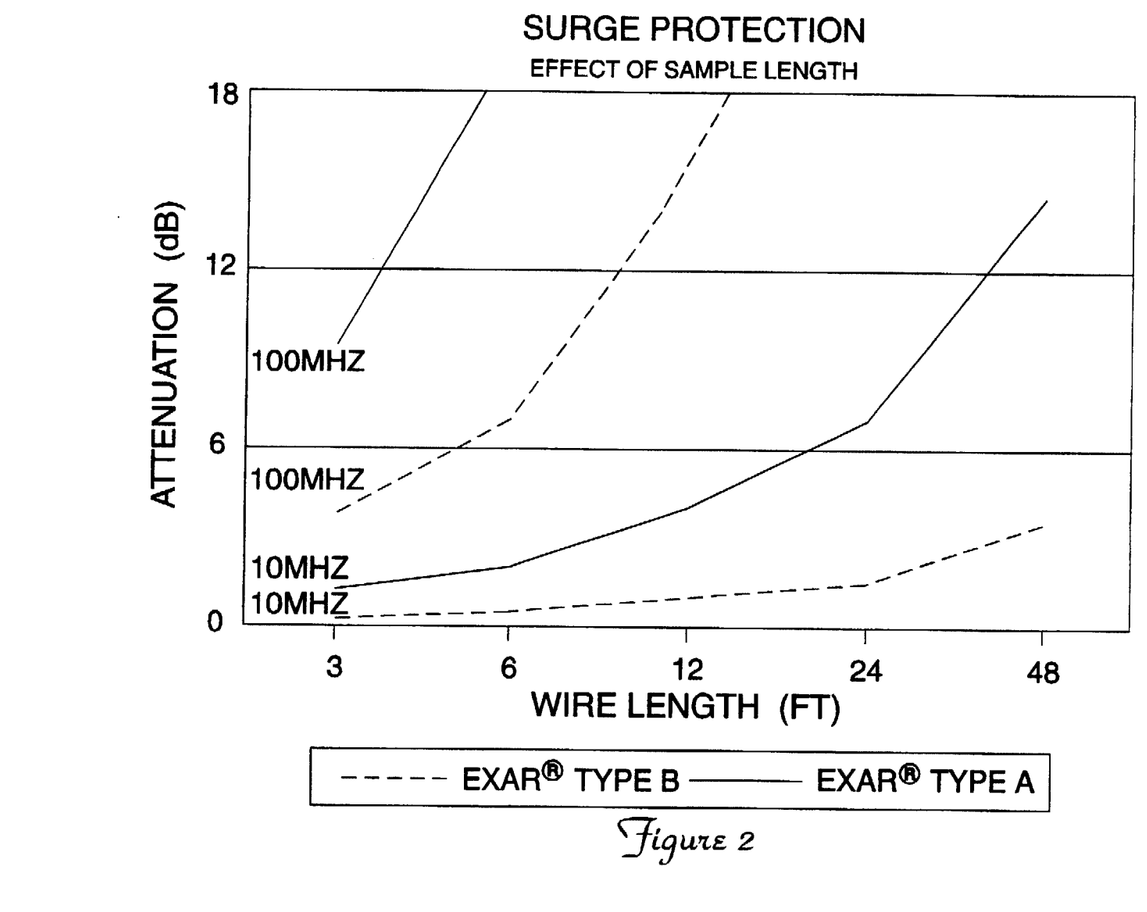
FIG. 2 illustrates a graph depicting the attenuation provided by the filter line type of cable of the invention, as compared with ordinary cable as a measure of wire length.
Figure 3:
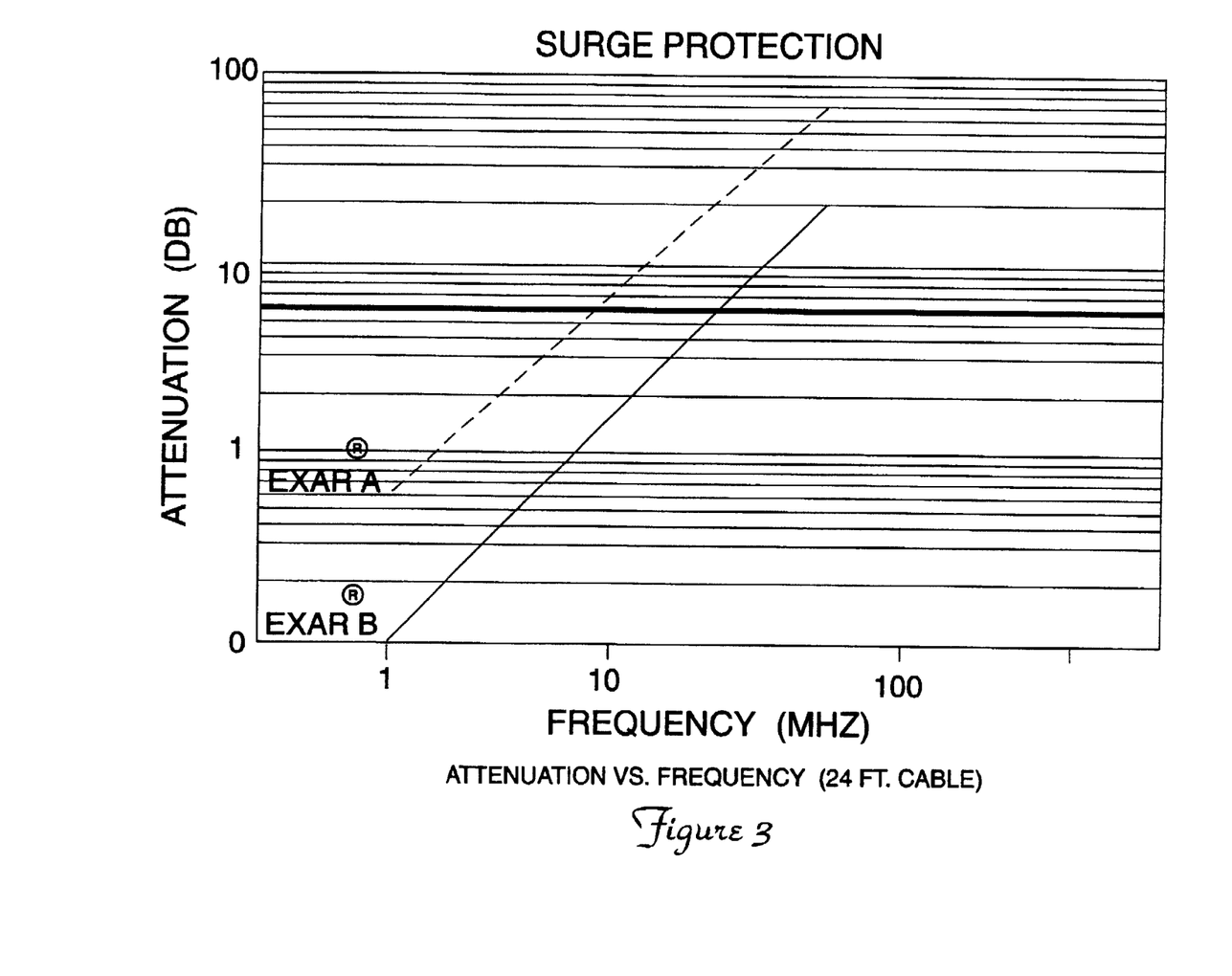
FIG. 3 shows a graph illustrating the attenuation provided by the filter line type of cable of this invention, as compared with ordinary cable as a function of frequency.

Referring to FIGS. 2 and 3, attenuation comparisons are illustrated between cable fabricated with and without ferrites disposed in the primary EXAR® insulation layer 13 (FIG. 1a). The EXAR® A cable containing the ferrites illustrates increased attenuation over the EXAR® B cable without the ferrites. FIG. 3 shows that, over a frequency range of 0.1 MHz to 100 HMz, attenuation in a twenty-four-foot cable with ferrites in the EXAR® layer will be 50% greater than cable fabricated without the ferrites.

FIG. 2 illustrates that ferrite-filled EXAR® insulation will provide a cable with increasing attenuation capability, as the length of the cable increases for frequencies of 10 MHz and 100 MHz. This clearly demonstrates that high voltage spikes and voltages with high rates of rise will be attenuated as they travel down the length of the filter line type of cable of this invention.

The flame-retardant, cross-linked primary insulation layer 13 of FIG. 1a can be EPDM or a fluoroelastomer.

The flame-retardant, cross-linked jacket insulation layer 14 of FIG. 1 can be a polymer material with a temperature rating of at least 125° C.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A filter line type of cable having voltage surge protection capability and having special usefulness in the fabrication of electrical motors or coils, comprising:

a conductive core member;

a primary polymer layer comprising a cross-linked polymer material consisting of at least 20% by volume of ferrite or magnetite disposed over said conductive core, said ferrite- or magnetite-filled primary polymer layer having the capability of attenuating high-frequency voltage peaks or dampening the high rate of rise voltages from square wave type signals traveling down a length of said filter line type of cable; and an outer, flame-retardant insulation layer disposed over said primary polymer layer, said outer, flame-retardant insulation layer comprising a polyolefin material.

2. The filter line type of cable in accordance with claim 1, wherein said cross-linked polymer material of said primary polymer layer comprises a fluoroelastomer.

3. The filter line type of cable in accordance with claim 1, wherein said primary polymer layer comprises ethylene-propylene-diene monomer (EPDM) elastomeric material.

4. The filter line type of cable in accordance with claim 1, wherein said outer, flame-retardant insulation layer comprises a cross-linked polymer material with a temperature rating of at least 125° C.

5. A filter line type of cable having voltage surge protection capability at frequencies in excess of 1 MHz, or where voltage rise times are faster than 2 microseconds, and having special usefulness in the fabrication of VFD-driven, three-phase electrical motors, comprising:

a conductive core member;

a primary polymer layer comprising a cross-linked polymer containing ferrite- or magnetite-filled material disposed over said conductive core, said ferrite- or magnetite-filled primary polymer layer having the capability of attenuating high-frequency voltage peaks or dampening the high rate of rise voltages from square wave type signals traveling down a length of said filter line type of cable; and a flame-retardant outer layer of insulation disposed over said primary layer, said outer, flame-retardant insulation layer comprising a polyolefin material.

6. The filter line type of cable in accordance with claim 5, wherein said cross-linked polymer material of said primary layer comprises a fluoroelastomer.

7. The filter line type of cable in accordance with claim 5, wherein said primary layer comprises ethylene-propylene-diene monomer (EPDM) elastomeric material.

8. A filter line type of cable having voltage surge protection capability at frequencies in excess of 1 MHz, and having special usefulness in the fabrication of VFD-driven, three-phase electrical motors, comprising:

a conductive core member;

a layer of ferrite- or magnetite-filled primary material comprising an elastomer disposed over said conductive core, said ferrite- or magnetite-filled primary material being cross-linked and having the capability of attenuating voltage peaks and the high rate of rise voltages traveling down a length of said filter line type of cable; and a flame-retardant, outer layer comprising an olefin material disposed over said layer of primary material.

9. The filter line type of cable in accordance with claim 8, wherein said flame-retardant, outer layer is cross-linked.

* * * * *